United States Patent
Tandjung et al.

(10) Patent No.: US 9,279,438 B2
(45) Date of Patent: Mar. 8, 2016

(54) AIRCRAFT INTERIOR BRACKET

(71) Applicant: C&D ZODIAC, INC., Huntington Beach, CA (US)

(72) Inventors: Darmo Tandjung, Huntington Beach, CA (US); Tyler Smithson, Huntington Beach, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 0 days.

(21) Appl. No.: 14/540,195

(22) Filed: Nov. 13, 2014

(65) Prior Publication Data

US 2015/0129728 A1  May 14, 2015

Related U.S. Application Data

(60) Provisional application No. 61/903,638, filed on Nov. 13, 2013.

(51) Int. Cl.
*F16B 5/06* (2006.01)
*F16B 11/00* (2006.01)

(52) U.S. Cl.
CPC .............. *F16B 5/0614* (2013.01); *F16B 11/006* (2013.01); *Y10T 29/49895* (2015.01); *Y10T 29/49966* (2015.01)

(58) Field of Classification Search
CPC ........ F16B 5/02; F16B 11/006; B60P 7/0815; B64C 1/20; B64D 11/0636
USPC ......................... 248/205.4, 503; 410/105, 102
See application file for complete search history.

(56) References Cited

U.S. PATENT DOCUMENTS

| | | | | |
|---|---|---|---|---|
| 3,031,217 A | * | 4/1962 | Tinnerman | A47B 57/565 403/187 |
| 3,339,609 A | | 9/1967 | Cushman | |
| 3,403,641 A | * | 10/1968 | Baker | A47B 47/042 108/152 |
| 4,062,298 A | * | 12/1977 | Weik | B60P 7/0815 248/503 |
| 4,214,416 A | | 7/1980 | Fischer | |
| 4,932,805 A | | 6/1990 | Mullen | |
| 5,169,062 A | * | 12/1992 | Baker | A47G 29/1203 232/1 C |
| 5,207,043 A | * | 5/1993 | McGee | E04B 1/7616 52/379 |
| 5,240,543 A | | 8/1993 | Fetterhoff | |
| 5,846,018 A | * | 12/1998 | Frobosilo | E04B 2/96 403/2 |
| 2012/0284970 A1 | | 11/2012 | May | |

OTHER PUBLICATIONS

International Search Report and Written Opinion issued on Mar. 10, 2015 in PCT/US14/65366.

* cited by examiner

*Primary Examiner* — Anita M King
(74) *Attorney, Agent, or Firm* — Jeffer Mangels Butler & Mitchell LLP; Brennan C. Swain, Esq.

(57) ABSTRACT

A bracket that includes a main body portion having a first portion and a second portion that form a first angle therebetween. The first portion includes opposing front and rear surfaces and the second portion includes opposing upper and lower surfaces. The first portion includes a fastener opening defined therethrough, the second portion includes an insert feature extending from the lower surface, and the second portion includes at least one adhesive opening defined therethrough.

12 Claims, 6 Drawing Sheets

AIRCRAFT INTERIOR BRACKET

CROSS REFERENCE TO RELATED APPLICATIONS

This application claims the benefit of U.S. Provisional Application No. 61/903,638, filed Nov. 13, 2013, which is herein incorporated by reference in its entirety.

FIELD OF THE INVENTION

The present invention relates generally to a bracket, and more particularly to a bracket for securing two panels to one another.

BACKGROUND OF THE INVENTION

Components in aircraft interiors, such as shelving, access covers, small parts, stoppers/bumpers, monuments, panels, walls, bins and other parts within an aircraft include panels or other members that are secured together with fasteners, adhesives, brackets or the like. A need exists for an improved bracket for securing components to one another. For example, the present invention can be used to replace current L and T mortise and tenon bonded joints.

SUMMARY OF THE PREFERRED EMBODIMENTS

The present invention is a bracket that can be used for joining panels particularly in aircraft interiors. In accordance with a first aspect of the present invention there is provided a bracket that includes a main body portion having a first portion and a second portion that form a first angle therebetween. The first portion includes opposing front and rear surfaces and the second portion includes opposing upper and lower surfaces. The first portion includes a fastener opening defined therethrough, the second portion includes an insert feature extending from the lower surface, and the second portion includes at least one adhesive opening defined therethrough. In a preferred embodiment, the insert feature includes a post having a foot on a distal end thereof. Preferably the insert feature also includes an alignment portion extending from the lower surface of the second portion such that the post extends between the alignment portion and the foot. In a preferred embodiment, the front surface of the first portion and the upper surface of the second portion include a curved surface therebetween. Preferably, the adhesive opening extends through the second portion and the alignment portion.

In accordance with another aspect of the present invention there is provided a component assembly that includes a first component and at least one bracket. The first component includes a surface to be joined and an end surface, and a bracket opening having a first shape defined in the surface to be joined. The bracket includes a main body portion having a first portion and a second portion that form a first angle therebetween. The first portion includes opposing front and rear surfaces and the second portion includes opposing upper and lower surfaces. The first portion includes a fastener opening defined therethrough, the second portion includes an insert feature extending from the lower surface, and the second portion includes at least a first adhesive opening defined therethrough. The insert feature extends into the bracket opening and the lower surface of the second portion is in contact with the surface to be joined of the first component. An adhesive secures the insert feature within the bracket opening and the first adhesive opening is in communication with the bracket opening. In a preferred embodiment the bracket opening has approximately the same outer shape as the alignment portion. Preferably, the component assembly further comprises a second component that includes a surface to be joined and an end surface. The rear surface of the first portion is in contact with the surface to be joined of the second component, and a fastener extends through the fastener opening and secures the first portion to the second component.

In accordance with another aspect of the present invention there is provided a method of forming a component assembly. The method includes obtaining a first component that includes a surface to be joined and an end surface, and obtaining a first bracket that includes a main body portion having a first portion and a second portion that form a first angle therebetween. The first portion includes opposing front and rear surfaces and the second portion includes opposing upper and lower surfaces. The first portion includes a fastener opening defined therethrough, the second portion includes an insert feature extending from the lower surface, and the second portion includes at least a first adhesive opening defined therethrough. The method also includes forming a bracket opening having an outer shape in the surface to be joined of the first component, inserting the insert feature into the bracket opening such that the lower surface of the second portion is in contact with the surface to be joined of the first component, and flowing adhesive through the first adhesive opening and into the bracket opening. In a preferred embodiment, the insert feature includes a post having a foot on a distal end thereof and an alignment portion extending from the lower surface of the second portion. The alignment portion has an outer shape that is approximately the same as the bracket opening outer shape, and the method includes the step of inserting the alignment portion into the bracket opening. In a preferred embodiment, the method also includes adhering a piece of tape to the upper surface of the second portion and the surface to be joined of the first component before inserting or flowing the adhesive into the adhesive opening. The piece of tape has an opening therein that is aligned with the first adhesive opening. The method can also include obtaining a second component that includes a surface to be joined and an end surface, and inserting a fastener through the fastener opening to secure the first portion to the second component.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 1:
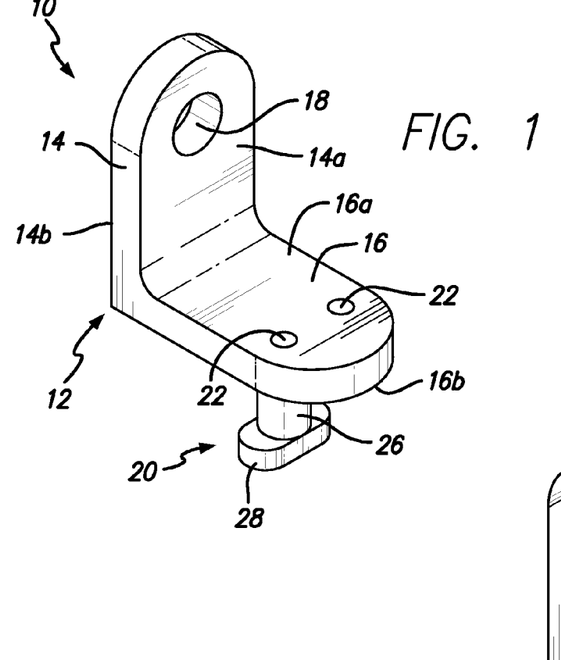
FIG. 1 is a perspective view of a bracket in accordance with a preferred embodiment of the present invention.

FIGS. 1-7 show a bracket 10 in accordance with a preferred embodiment of the present invention. As shown, in a preferred embodiment, the bracket 10 generally includes a main body portion 12 with a first portion 14 and a second portion 16 that form a first angle A1 therebetween. Any angle between 1° and 180° is within the scope of the present invention. In a preferred embodiment, angle A1 is between about 45° and about 135°. In a more preferred embodiment angle A1 is between about 60° and about 120°. As shown in FIG. 1, in the most preferred embodiment angle A1 is approximately 90°. However, this is not a limitation and different angles can be utilized for junctions between components with surfaces that meet at angles different than 90°.

Figure 2:
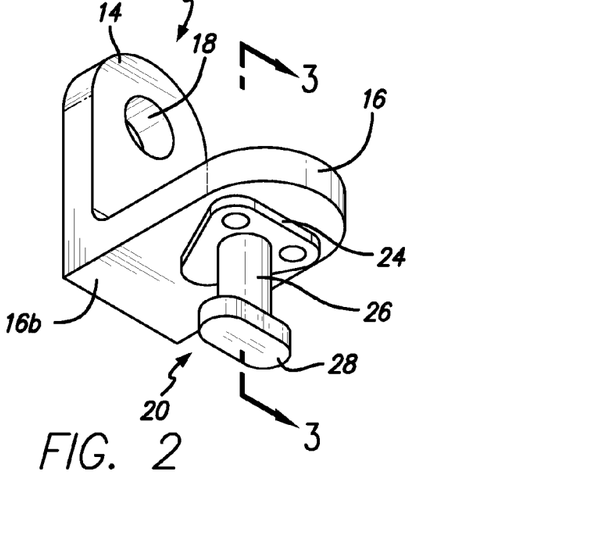
FIG. 2 is a another perspective view of the bracket of FIG. 1.

As shown in FIGS. 1-2, the first portion 14 includes opposing front and rear surfaces 14*a* and 14*b* and the second portion 16 includes opposing upper and lower surfaces 16*a* and 16*b*. The first portion 14 preferably includes at least one fastener opening 18 defined therethrough. In a preferred embodiment, the second portion 16 includes an insert feature 20 extending from the lower surface 16*b* and includes at least one and preferably two adhesive openings 22 defined therethrough.

Figure 3:
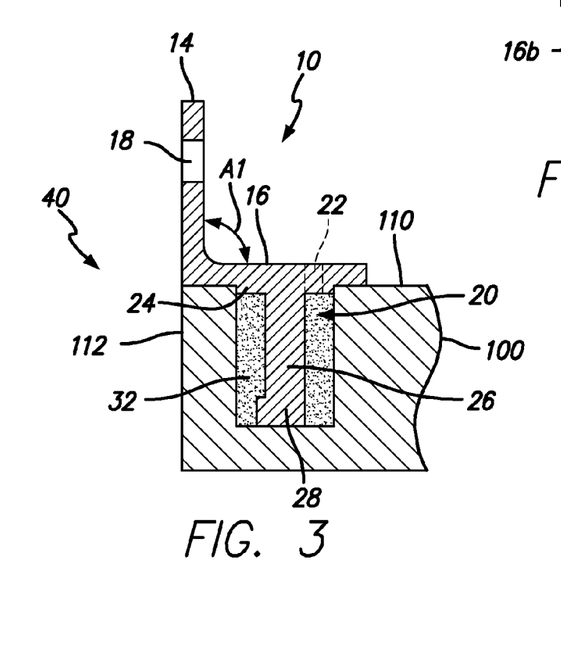
FIG. 3 is a cross section taken along line 3-3 of FIG. 2.

As shown in FIGS. 2-3, In a preferred embodiment, the insert feature 20 includes an alignment protrusion 24 formed or secured on the lower surface 16*b* of the second portion 16, a post 26 and a foot 28 on the distal end of the post 26. The post 26 extends between the alignment protrusion 24 and the foot 28. In an embodiment, the alignment protrusion 24 can be omitted. In another embodiment, the post and foot can be omitted and the alignment protrusion 24 can extend further downwardly from the lower surface 16*b*. In another embodiment, the foot 28 can be positioned other than at the distal end of the post 26 (e.g., in the middle of the post 26). As shown in FIG. 2, the adhesive openings 22 extend through the second portion 16 and the alignment protrusion 24.

It will be appreciated by those of ordinary skill in the art that the insert feature 20 allows the bracket 10 to be bonded into a bracket opening 30 in a panel. For discussion purposes only and is shown in the drawings the panel that includes the bracket opening(s) 30 will be referred to herein as the first component 100 as the bracket 10 can be used to join any two components together. For example, the first component 100 can be a honeycomb panel. However, this is not a limitation on the present invention and any type of panel or other member can be used. The insert feature 20 allows the bracket 10 to be bonded into different panels with different thicknesses. Typically, a panel includes opposing top and bottom surfaces, first and second opposing end edges, and first and second opposing side edges. In the drawings, the surfaces that are to be joined together are labeled 110 and the adjacent end or side surfaces are labeled 112. In another embodiment, the second component or panel can be positioned such that the components together form a T-joint.

Figure 4:
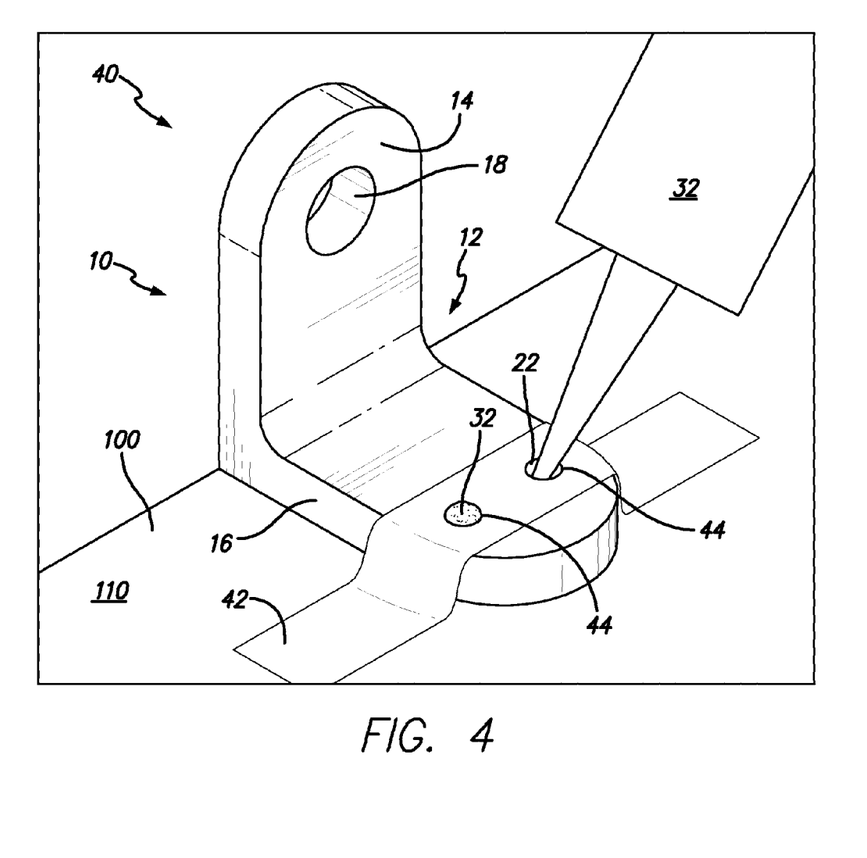
FIG. 4 is a perspective view of the bracket of FIG. 1 being secured to a panel.

FIGS. 3-4 shows a panel assembly or component assembly 40 that includes the first component 100 and the bracket 10. In a preferred embodiment, the bracket opening 30 in the first component 100 is formed in a shape. As shown in FIG. 3 (and comparing FIG. 2 to FIG. 4), in a preferred embodiment, the alignment protrusion 24 has generally the same shape as the bracket opening 30. This provides installation alignment and orientation of the bracket 10 on the first component 100, when the insert feature 20 is inserted into the bracket opening 30. In a preferred embodiment, the alignment protrusion 24 has a generally triangular shape with rounded corners that provides a "snap" feel when inserted properly into the bracket opening 30 in the first component 100 with the corresponding shape. The alignment protrusion 24 and corresponding bracket opening 30 can have different corresponding shapes in different embodiments. In another embodiment, the shapes of the alignment protrusion 24 and the bracket opening 30 can be different. As shown in FIG. 3, when the alignment protrusion 24 is properly inserted into the bracket opening 30, the rear surface 14b of the first portion 14 is aligned with an end surface 112 of first component 100.

As shown in FIGS. 3-4, the adhesive openings 22 allow adhesive 32 to be injected therethrough and into the first component 100 for adhering the insert feature 20 and securing the bracket 10 to the first component 100. In a preferred embodiment, tape 42, which includes openings 44 that are coaxial with the adhesive openings 22, can be used to hold the bracket 10 in place during installation and adhesive 32 injection and while the adhesive 32 cures. As shown in FIG. 3, in a preferred embodiment, the foot 28 is seated on a bottom surface of the bracket opening 30. In another embodiment, the foot 28 is not seated against the bottom surface.

Figure 5:
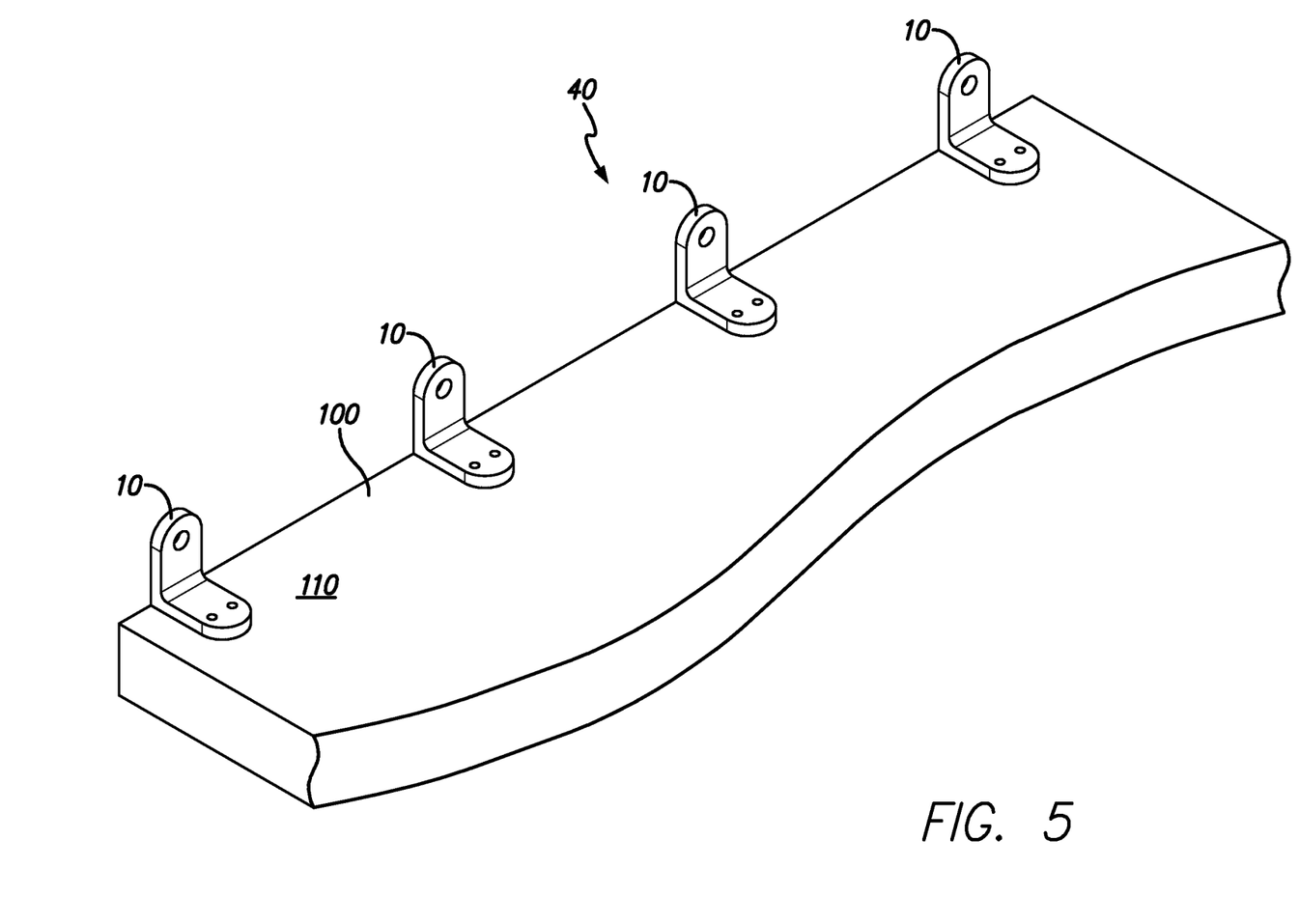
FIG. 5 is a perspective view of a plurality of brackets of FIG. 1 secured to a panel.

FIG. 5 shows a plurality of brackets 10 secured to first component 100. It will be appreciated that several brackets 10 will typically be installed along a panel depending on load requirements, etc. The pitch/frequency of the brackets 10 can be adjusted according to load requirements.

Figure 6:
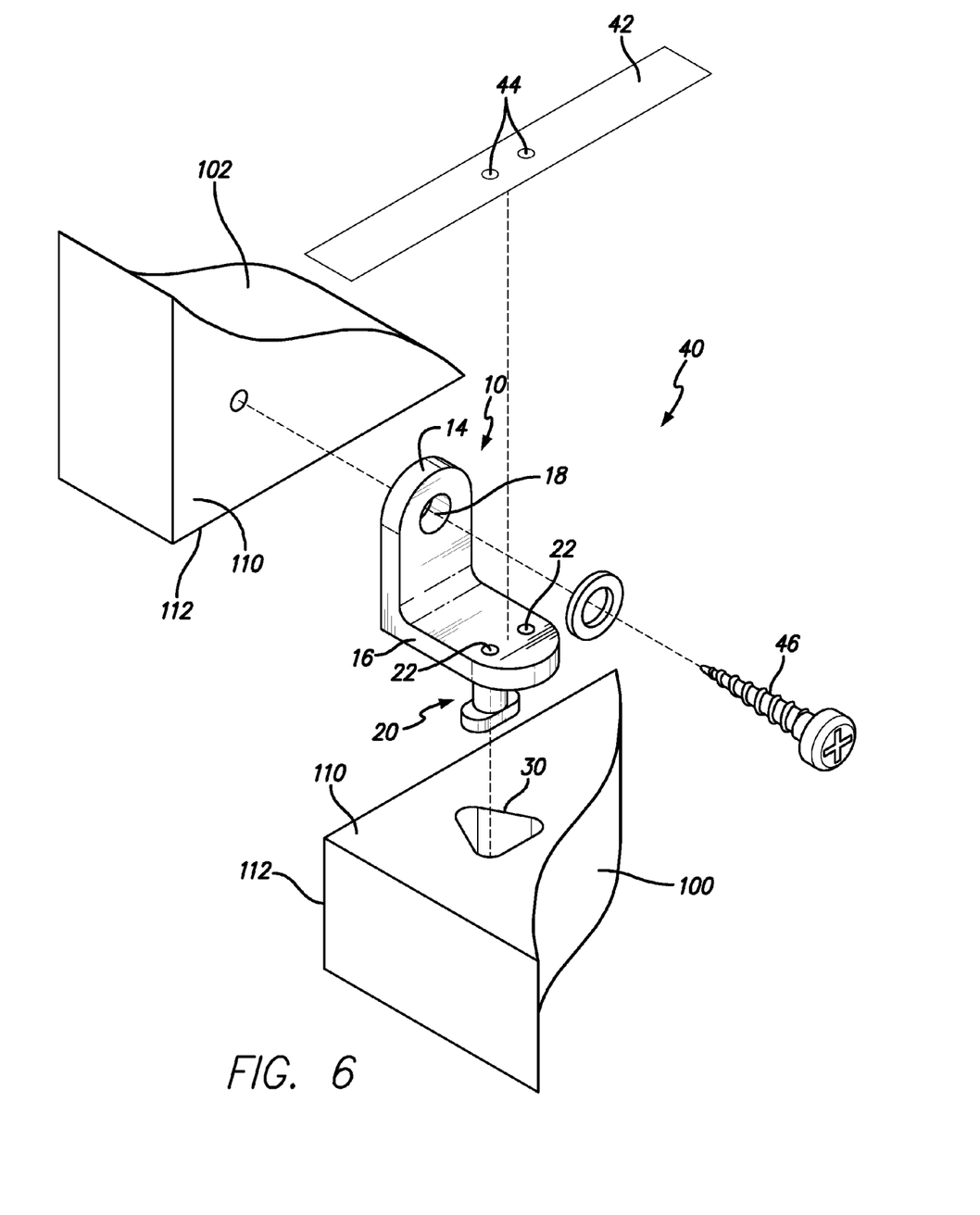
FIG. 6 is an exploded perspective view of the bracket of FIG. 1 together with first and second panels.
Figure 7:
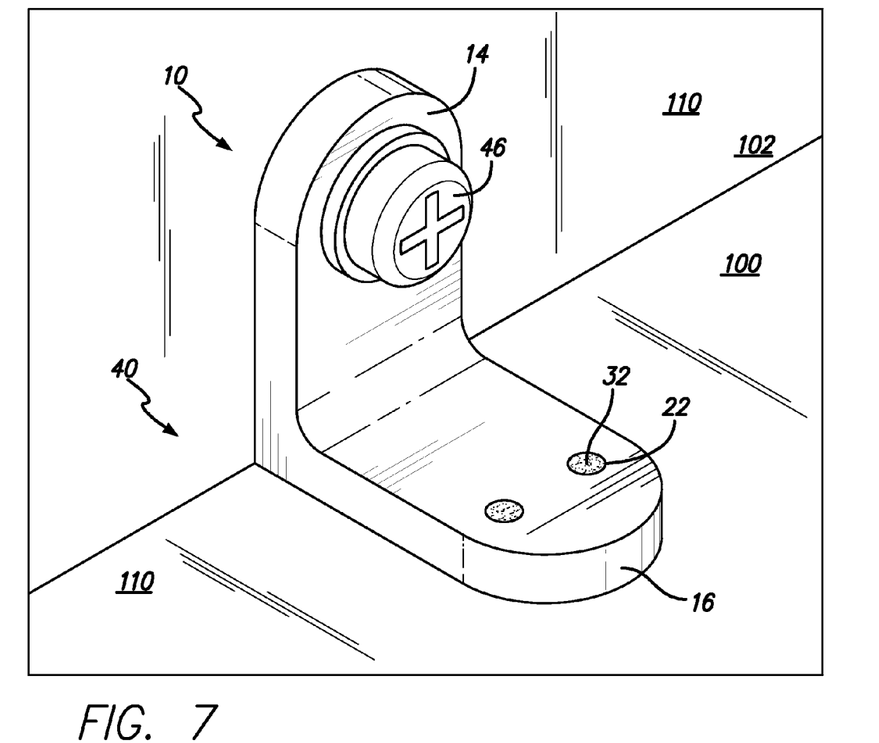
FIG. 7 is a perspective view of the bracket of FIG. 1 securing first and second panels to one another.

FIGS. 6-7 show the component assembly 40 secured to a second component 102. In a preferred embodiment, a fastener 46 (e.g., screw, bolt, rivet, nail, etc.) or the like extends through fastener opening 18 and secures the first portion 14 to the second component 102. The fastener opening 18 can include a countersink, if necessary. Preferably, the fastener opening 18 is oversized (compared to the size of the fastener 46) to provide installation adjustment/tolerance. In another embodiment, a quick release attachment can be provided instead of or in addition to the fastener opening 18. In another embodiment, the first portion 14 can include an insert feature and adhesive openings just like the ones on the second portion.

Figure 8:
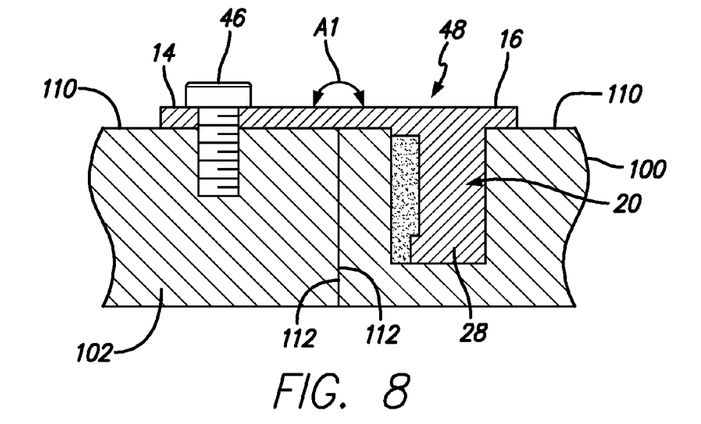
FIG. 8 is an elevational view of another embodiment of a bracket in accordance with a preferred embodiment of the present invention.

FIG. 8 shows an embodiment of a bracket 48 where angle A1 is 180°. In this embodiment, the bracket 48 secures first and second components 100 and 102 that include co-planar surfaces 110 and are essentially positioned end-to-end to one another.

In a preferred embodiment, the bracket 10 is made of metal. However, non-metal materials (e.g., plastic, composites, wood) are also within the scope of the present invention. A ductile material allows the load to be distributed to several different brackets 10 along the panel.

Figure 9:
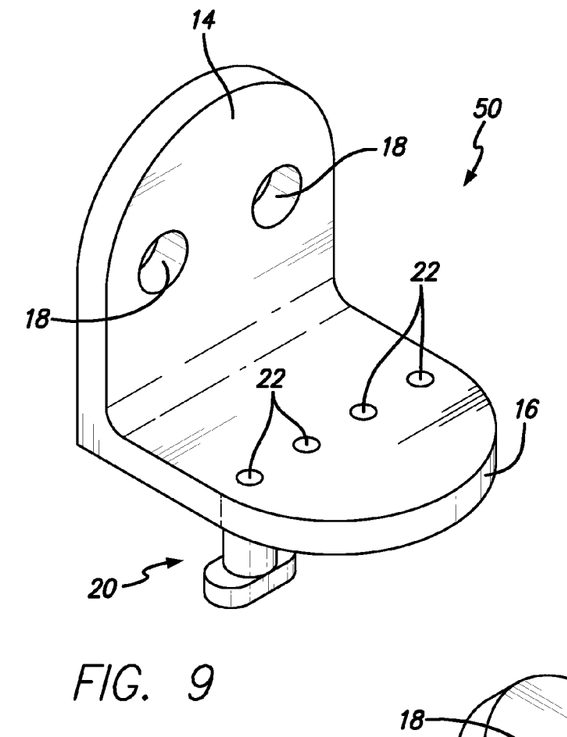
FIG. 9 is a perspective view of another embodiment of a bracket in accordance with a preferred embodiment of the present invention.
Figure 10:
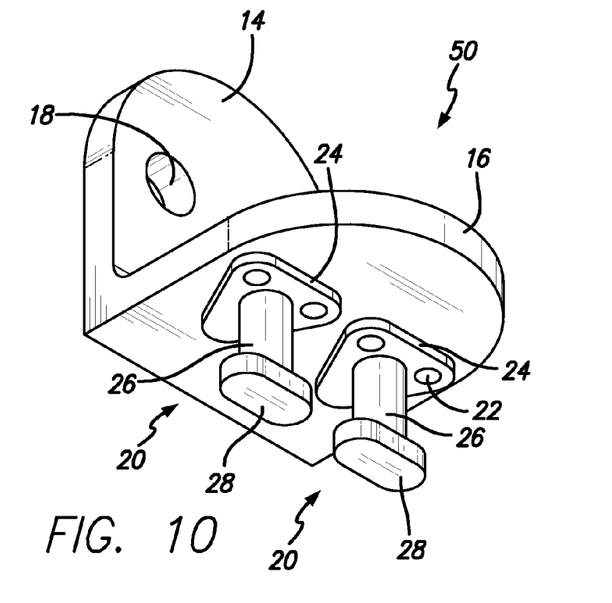
FIG. 10 is another perspective view of the bracket of FIG. 9.

As shown in FIGS. 9-10, in another embodiment, a single bracket 50 can include multiple fastener openings 18 and/or multiple insert features 20 for higher load applications. Those of ordinary skill in the art will appreciate that bracket 10 can be used for installing/joining shelving, access covers, small parts, stoppers/bumpers, monuments, panels, or other parts within an aircraft. The bracket 10 can also be utilized outside of an aircraft interior.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A bracket comprising:
    a main body portion that includes a first portion and a second portion that form a first angle therebetween, wherein the first portion includes opposing front and rear surfaces and the second portion includes opposing upper and lower surfaces, wherein the first portion includes a fastener opening defined therethrough, wherein the second portion includes an insert feature extending from the lower surface, wherein the insert feature includes a post having a foot on a distal end thereof, wherein the insert feature includes an alignment portion extending from the lower surface of the second portion, wherein the post extends between the alignment portion and the foot and wherein the second portion includes at least one adhesive opening defined therethrough.

2. The bracket of claim 1 wherein the first angle is between about 45° and about 180°.

3. The bracket of claim 2 wherein the first angle is about 90°.

4. The bracket of claim 3 wherein the front surface of the first portion and the upper surface of the second portion include a curved surface therebetween.

5. The bracket of claim 1 wherein the adhesive opening extends through the second portion and the alignment portion.

6. A component assembly comprising:
    a first component that includes a surface to be joined and an end surface, and a bracket opening having a first shape defined in the surface to be joined, and
    at least one bracket that includes a main body portion having a first portion and a second portion that form a first angle therebetween, wherein the first portion includes opposing front and rear surfaces and the second portion includes opposing upper and lower surfaces, wherein the first portion includes a fastener opening defined therethrough, wherein the second portion includes an insert feature extending from the lower surface, and wherein the second portion includes at least a first adhesive opening defined therethrough,
    wherein the insert feature extends into the bracket opening and the lower surface of the second portion is in contact with the surface to be joined of the first component, wherein an adhesive secures the insert feature within the bracket opening and wherein the first adhesive opening is in communication with the bracket opening.

7. The component assembly of claim 6 wherein the insert feature includes a post having a foot on a distal end thereof.

8. The component assembly of claim 7 wherein the insert feature further comprises an alignment portion extending from the lower surface of the second portion and received in the bracket opening, and wherein the post extends between the alignment portion and the foot.

9. The component assembly of claim 8 wherein the bracket opening has approximately the same outer shape as the alignment portion.

10. The component assembly of claim 9 further comprising a second component that includes a surface to be joined and an end surface, wherein the rear surface of the first portion is in contact with the surface to be joined of the second component, and a fastener extends through the fastener opening and secures the first portion to the second component.

11. The component assembly of claim 6 wherein the first angle is between about 45° and about 135°.

12. The component assembly of claim 6 wherein the first angle is about 90°.

* * * * *